US009635636B1

United States Patent
Cai et al.

(10) Patent No.: US 9,635,636 B1
(45) Date of Patent: Apr. 25, 2017

(54) LOCATION PROCESSING IN A VOLTE NETWORK

(71) Applicant: Alcatel-Lucent USA Inc., Murray Hill, NJ (US)

(72) Inventors: Yigang Cai, Naperville, IL (US); Ranjan Sharma, New Albany, OH (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

(21) Appl. No.: 14/985,521

(22) Filed: Dec. 31, 2015

(51) Int. Cl.
*H04W 24/00* (2009.01)
*H04W 64/00* (2009.01)
*H04W 80/10* (2009.01)
*H04L 12/14* (2006.01)
*H04L 29/12* (2006.01)

(52) U.S. Cl.
CPC ......... *H04W 64/00* (2013.01); *H04L 12/1403* (2013.01); *H04L 61/203* (2013.01); *H04W 80/10* (2013.01)

(58) Field of Classification Search
USPC .............................................. 455/456.1, 406
See application file for complete search history.

(56) References Cited

U.S. PATENT DOCUMENTS

| 8,116,728 B2 | 2/2012 | Cai et al. |
| 9,026,075 B2 | 5/2015 | Sharma et al. |
| 2013/0322344 A1 | 12/2013 | Li et al. |

FOREIGN PATENT DOCUMENTS

EP   1619854 A1   1/2006

OTHER PUBLICATIONS

GSM Association, Official Document FCM.01—VoLTE Service Description and Implementation Guidelines, Version 1.1, Mar. 26, 2014—121 pages.

*Primary Examiner* — Joel Ajayi
(74) *Attorney, Agent, or Firm* — Niraj A. Desai

(57) ABSTRACT

Systems and methods for processing location or time zone information updates during a VoLTE call session teardown are provided. In one aspect, a Network Element (NE) of the IP Multimedia Subsystem (IMS) transmits a Session Initiation Protocol (SIP) session end message to a subscriber User Equipment (UE) to teardown a VoLTE session. The NE generates (but does not send) an Accounting Charge Request (ACR) STOP message for the VoLTE session. The NE receives a SIP response message, and determines if it includes an update to the UE's last known User Location Information (ULI) or the UE's last known Time-Zone (TZ). The NE includes the any updates to the ULI or TZ in the generated ACR STOP message if included in the SIP response, and, transmits the ACR STOP message to an Offline Charging System (OFCS) of the telecommunications network using the Diameter Protocol.

15 Claims, 3 Drawing Sheets

LOCATION PROCESSING IN A VOLTE NETWORK

TECHNICAL FIELD

The present disclosure is directed towards communication systems, and in particular, to location based services in telecommunication systems.

BACKGROUND

LTE is a high-bandwidth wireless communications access standard developed by the 3rd Generation Partnership Project (3GPP) that enables packet-based voice, data and multimedia services. The IP Multimedia Subsystem (IMS) is an access-network independent framework for delivering internet protocol (IP) multimedia to LTE capable UEs using Packet-Switched (PS) services. IMS uses the ubiquitous IETF (i.e., Internet) packet protocols such as the Session Initiation Protocol (SIP) for maximum compatibility and interconnectivity between different packet networks. Voice over LTE also known as VoLTE, enables LTE voice calls over Packet Switched (PS) networks by leveraging the IP Multimedia Sub-System (IMS) of a telecommunication service provider's Core Network (CN).

Telecommunication service providers use offline and online charging systems to keep track of the resource/services usage incurred by each subscriber UE of the telecommunication network. The 3GPP/3GPP2 standards groups have defined a set of specifications that may be used to implement online charging systems and offline charging systems in the various network domains (e.g., a Circuit-Switched (CS) domain, a Packet-Switched (PS) domain, and/or a wireless domain), IP multimedia subsystems, and emerging 3G/OMA application services.

VoLTE calls support mobility of LTE enabled User Equipment (UE) devices. Mobile UEs, such as enabled cell phones, personal data assistants, smart phones, notebook computers, etc., may access the VoLTE services of a telecommunication network via an over the air interface with one or more LTE base stations. Location updates are sent from the telecommunication network the Offline Charging System (OFCS), which processes charging information, including updated location data, through a chain of charging functions that are part of the OFCS. The resulting Charging Data Record (CDR) files are transferred from the OFCS to the network operator's Billing Domain for subscriber billing and/or inter-operator accounting.

BRIEF SUMMARY

Systems and methods for processing location or time-zone changes during teardown of a VoLTE call session are provided.

In one aspect, a network element of a telecommunications network is configured to transmit a Session Initiation Protocol (SIP) session end message to a subscriber User Equipment (UE) to teardown a VoLTE session being provided to the UE over the telecommunications network; receive a SIP response message from the UE; determine whether the SIP response message includes an update to the UE's last known User Location Information (ULI) or the UE's last known Time-Zone (TZ); generate a Accounting Charge Request (ACR) STOP message for the VoLTE session; include the update to the UE's last known ULI or the UE's last known TZ in the generated ACR STOP message if included in the SIP response; and; transmit the ACR STOP message to an Offline Charging System (OFCS) of the telecommunications network using the Diameter Protocol.

In one aspect the network element is further configured to indicate a VoLTE session end time in the ACR STOP message to the OFCS based on the time of transmission of the SIP session end message to the UE.

In one aspect the SIP session end message is an SIP BYE message.

In one aspect the SIP response message is an SIP OK or a SIP 2xx/3xx/4xx error message.

In one aspect the network element is further configured to include an enumerated value in an Address-Value-Pair (AVP) field of the ACR STOP message for indicating to the OFCS that a change in the UE's last known ULI has been detected and that the update to the UE's last known ULI is included in the ACR STOP message.

In one aspect the network element is further configured to include an enumerated value in an Address-Value-Pair (AVP) field of the ACR STOP message for indicating to the OFCS that a change in the UE's last known ULI has not been detected and no update to the UE's last known ULI is included in the ACR STOP message.

In one aspect the network element is further configured to include an enumerated value in an Address-Value-Pair (AVP) field of the ACR STOP message for indicating to the OFCS that a change in the UE's last known TZ has been detected and that the update to the UE's last known TZ is included in the ACR STOP message.

In one aspect the network element is further configured to include an enumerated value in an Address-Value-Pair (AVP) field of the ACR STOP message for indicating to the OFCS that no change in the UE's last known TZ has been detected and that no update to the UE's last known TZ is included in the ACR STOP message.

In one aspect the network element is further configured to detect there has been a handover of the UE's VoLTE session into an Unlicensed Spectrum; and, include an enumerated value in an Address-Value-Pair (AVP) field of the ACR STOP message for indicating to the OFCS that the handover of the UE's VoLTE session into the Unlicensed Spectrum has been detected.

In one aspect the network element is further configured to determine that SIP response message is an SIP ERROR message that does not include an update to the UE's last known User Location Information (ULI) or the UE's last known Time-Zone (TZ); and, include an enumerated value in an Address-Value-Pair (AVP) field of the ACR STOP message for indicating to the OFCS that the UE's current ULI or UE's current TZ may have changed and is unknown.

DETAILED DESCRIPTION

Figure 1:
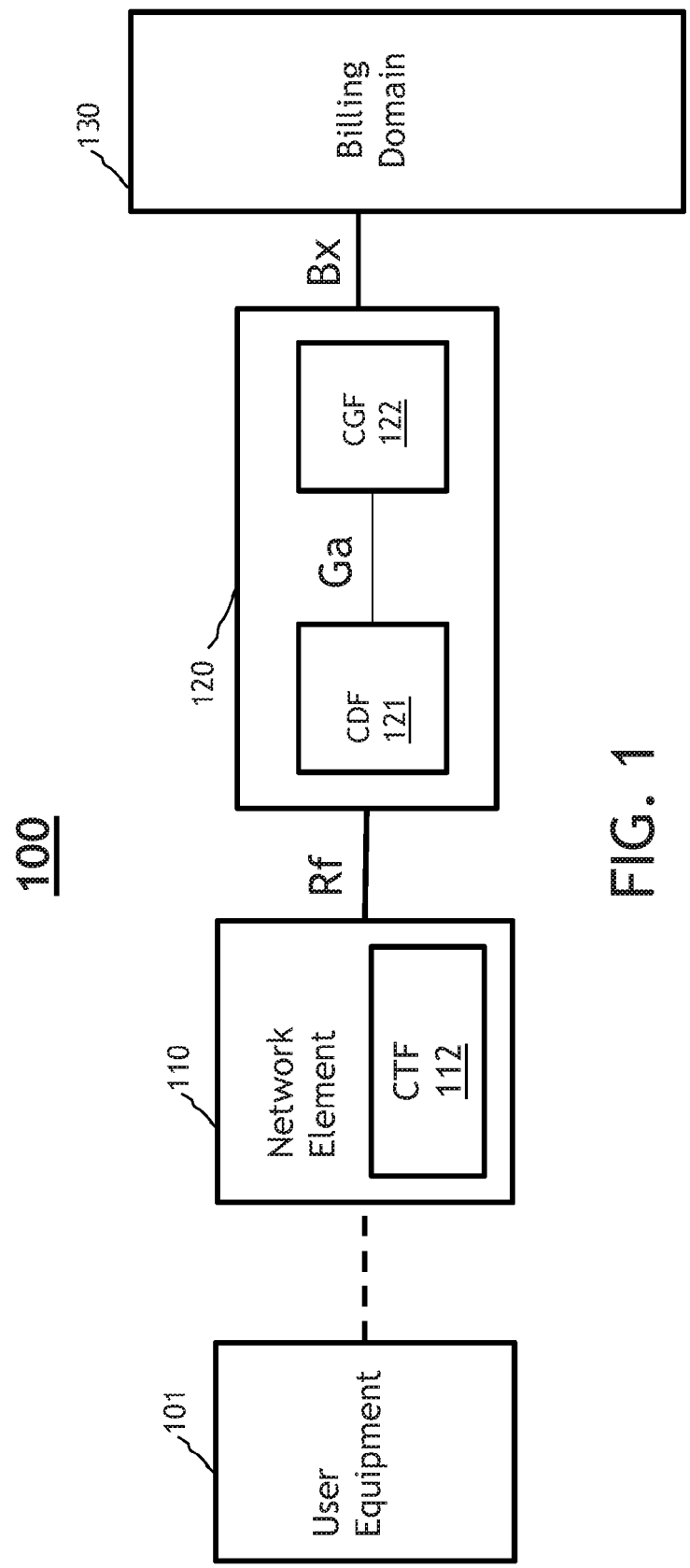
FIG. 1 illustrates an example embodiment of an offline charging architecture.

Various aspects of the disclosure are described below with reference to the accompanying drawings, in which like numbers refer to like elements throughout the description of the figures. The description and drawings merely illustrate the principles of the disclosure. It will be appreciated that those skilled in the art will be able to devise various arrangements that, although not explicitly described or shown herein, embody the principles and are included within spirit and scope of the disclosure.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted in a like fashion.

Offline Charging System (OFCS) provides the basis for post-paid billing for services rendered by telecommunication service providers, where subscribers are charged at the end of their billing cycle according to their usage of one or more services. Various network elements (NEs) implementing an integrated Charging Trigger Function (CTF) connect with and provide charging information to the OFCS for services rendered to one or more telecommunication subscribers User Equipment (UE). The OFCS receives the information regarding the chargeable events from one or more NE/CTFs and generates CDRs based on the chargeable information. A CDR is a formatted collection of information about a chargeable event (e.g., location of device, time of call set-up, duration of the call, amount of data transferred, etc.) for use in billing and accounting. CDRs pertaining to a particular session are correlated and optionally consolidated into a CDR file, which is made available to the billing domain for charging subscribers for various services and/or sessions provided by the telecommunications network.

Communications between the NE/CTFs and the OFCS occur via messages in accordance with the Diameter Protocol which is defined by the Internet Engineering Task Force (IETF) in RFC 6733 (which supersedes RFC 3588). Charging related messages (whether event-based or session-based) are provided by NEs (via an implemented CTF) to the OFCS in Accounting Request Messages (ACRs) using the Diameter Protocol. ACRs are used for both session-related and event-related charging/accounting. ACRs, and their responses, ACAs, consist of a Diameter Protocol header and a number of attribute-value pairs (AVPs) which form the data portion of the messages.

There are a number of mid-session service events (e.g., reauthorization triggers), which may affect the rating of a VoLTE call session. Once such event is a location update of a roaming mobile LTE enabled UE that is in the midst of a voice call session being provided via the LTE telecommunications network. A Charging Data Function (CDF) of an OFCS may typically receive interim updates anytime there is a change in the location of the LTE enabled UE, and such updates are provided by one or more Network Element(s) (NE) of the telecommunications network that are providing the voice call session accounting through their integrated Charging Trigger Function (CTF). The current location of a LTE enabled UE is indicated by a CTF of the NE to a CDF of the OFCS in a standardized Address Value Pair (AVP) field known as the User-Location-Info (ULI) AVP (code 22). Additional AVPs may also convey location estimates for an Online Charging System.

However, there are cases when a VoLTE session is terminated where a change in a location of an LTE enabled UE participating in a VoLTE call may not be properly reported by a CTF of an NE to the OFCS. The problem may become more severe if an NE, such as an IMS conference Application Server (AS) or a telephony supplementary service AS initiates a teardown of the VoLTE session. Viewed as a single instance, a location update that is not properly taken into account in a charging message sent from a NE/CTF to a CDF may represent a small impact in an overall accounting of a voice session provided over the LTE network. However, with many thousands upon thousands of voice session records being reported by one or more NE/CTFs to the OFCS in large LTE networks, the amount of revenue leakage may become more substantial. Furthermore, it is not just the location of the LTE UE which may change, but at times the Time Zone (TZ) of the LTE UE may also change. For example, a change in the TZ of a LTE enabled UE due to mobility, or upon the onset of Daylight Savings Time (DST) can influence charging for voice calls, and therefore, all three elements—location, TZ and the DST can play a role in the correct charging.

VoLTE enabled networks support both Licensed Assisted Access (LAA) in the licensed spectrum, and LTE WiFi Aggregation (LWA) in the unlicensed spectrum. Thus, an LTE enabled UE supporting dual connectivity may transition from one to the other in a single VoLTE call session. Handover involving dual connectivity, especially when coupled with improper or missing final UE location information at a NE when the UE transitions from one spectrum to another poses an acceptance issue with telecommunication service providers, as this gap represents a revenue leakage.

A similar situation may also arise when a NE such as a Voice Call Continuity AS (VCC-AS) handles a voice call handover between a Circuit Switched (CS) and a Packet Switched (PS) network and an NE such as a P-CSCF of the IMS is unable to properly account for changes in the LTE UE's location or time zone when reporting events to the OFCS.

In sum, there are a number of circumstances where an NE (e.g., IMS conference server, VCC-AS, P-CSCF, etc.) that enables a VoLTE session between an LTE enabled UE and another party may not properly account for and report a location or time-zone change of the LTE enabled UE to the OFCS at the end or handover of a VoLTE session, which may result in improper charging or revenue leakage for services rendered over a telecommunications network.

There are two-fold reasons why an NE, such as an AS of the IMS, may not report a location or time-zone change received from the LTE enabled UE to the OFCS during a teardown of a VoLTE session. First, when the NE transmits a SIP BYE message to a LTE enabled UE to initiate a teardown (e.g., due to call termination or handover) of a VoLTE session being provided to the UE via the telecommunications network, the NE conventionally does not take into account information in the response message that is received back from the UE to the SIP BYE message prior to reporting the end of the session to the OFCS. In fact, the NE conventionally reports the end of the VoLTE session to the OFCS in an ACR STOP message without either waiting for or processing the response message received from the UE in response to the SIP BYE message. The reason for transmitting the ACR STOP message prior to processing, or even receiving, the response message is to ensure that the subscriber does not incur additional charges for the VoLTE session during the time it takes for the response message to be received or processed at the NE. Although the conventional behavior described above is understandable, when the response message includes updated location or time-zone information reported by the UE, such updated information, relevant to charging, is not properly provided by the NE to the OFCS in the ACR STOP message.

The present disclosure is directed to systems and methods that address the foregoing deficiencies. In various aspects, the systems and methods described herein enable an NE, such as an AS of the IMS network of a telecommunication provider, to properly process any location or time-zone changes indicated by a UE during a teardown of the VoLTE session, while at the same time ensuring that the subscriber does not incur additional charges during such processing. Furthermore, in one aspect, the present disclosure enhances the conventional ACR STOP message transmitted by the NE to the OFCS by providing a new AVP field in the ACR STOP message, where the new AVP field is included by the NE in the ACR STOP message for informing the OFCS of the updates being reported to the OFCS, thus enabling efficient processing of the updated information by the OFCS. These and other aspects of the disclosure are now described in further detail below.

FIG. 1 illustrates a simplified architecture 100 in accordance with various aspects of the disclosure. Architecture 100 may be implemented in a packet-switched IMS network that provides LTE services to its subscribers (i.e., end user and associated LTE enabled User Equipment (UE)).

Architecture 100 includes a network element 110 that is interconnected to an Offline Charging System (OFCS) 120 and a LTE enabled UE 101. A network element 110 is an apparatus or equipment used in the provision of packet-based services provided by a telecommunications network to subscriber UEs, such as LTE enabled UE 101, such as a smart-phone or other mobile LTE enabled communications device. In various embodiments the network element 110 may be a Serving-Call Session Control Function (P-CSCF), an application server (AS) of an IMS network, a Serving Gateway (SGW) or a Packet Data Network Gateway (PGW) of an LTE network, etc. Network element 110 includes a Charging Trigger Function (CTF) unit 112 that detects chargeable events for services provided by network element 110, assembles information for the chargeable events into matching charging events, and sends the charging events to a Charging Data Function (CDF) of the OFCS 120. In the case of network element 110, CTF 112 uses a Diameter Rf interface. Therefore, CTF 112 assembles the charging information into accounting requests, such as one or more Diameter Rf Accounting Request messages (ACRs).

OFCS 120 is an apparatus, a server, a device, or a collection of processing equipment configured to implement offline charging for sessions or services provided by a telecommunications network. Offline charging can be of two types: session based or event based. In event based charging (i.e., session-less charging), the CTF reports the usage or the service rendered where the service offering is rendered in a single operation, such as subscriber registration, re-registration, de-registration, etc. The CTF reports session-less events in an Accounting Request Event message (ACR Event). Session based charging is the process of reporting usage reports for an entire service session that is provided over a duration of time. The CTF reports session messages as ACR START, ACR STOP, and ACR Interim messages that denote the start, end, and interim session accounting data for charging for the type and duration of a VoLTE session. During a VoLTE session that starts with an ACR Start message and ends with an ACR Stop message, the CTF may transmit multiple ACR Interim messages depending on the proceeding of the session.

As shown in FIG. 1, OFCS 120 includes a CDF 121. A CDF comprises a processing apparatus, unit, or module within OFCS 120 that receives charging events for one or more sessions from one or more CTFs. The CDF processes the received charging events to generate one or more CDRs for the sessions, and sends the CDRs to one or more Charging Gateway Function 122. A CGF comprises a processing apparatus, unit, or module within OFCS 120 that correlates CDRs for a session, and forwards a CDR file with the correlated CDRs to a billing domain 130. Billing domain 130 is the part of the operator network that receives and processes the session correlated CDR files for billing mediation and other billing applications (e.g., statistical applications).

CDF 121 in OFCS 120 communicates with CGF 122 over a Diameter Ga interface. In the case shown in FIG. 1, GTP' is used on the Ga interface to transport CDRs from the CDF to the CGF. A CDF interconnected to a CGF is also collectively known collectively a Charging Collection Function (CCF) of the OFCS.

Figure 2:
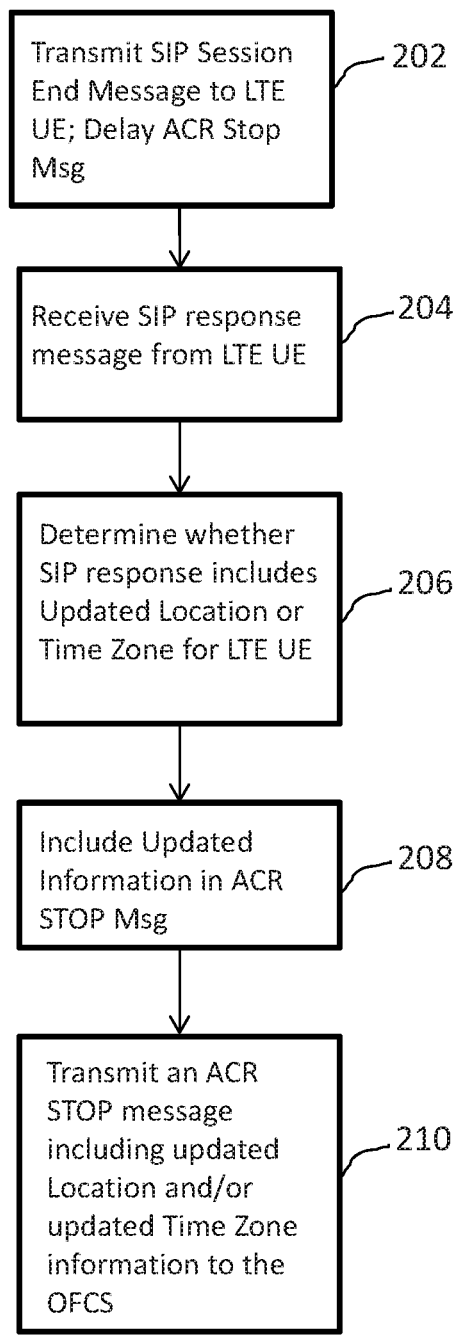
FIG. 2 illustrates an example process for processing session based messages in accordance with various aspects of the disclosure.

FIG. 2 illustrates an exemplary process 200 in accordance with various aspects of the disclosure, which is now described in conjunction with architecture 100 of FIG. 1.

The steps of process 200 will be described with reference to the NE 110 of the illustrated in FIG. 1, but those skilled in the art will appreciate that process 200 may be performed in other systems or functional units. Although the steps are described in a particular order to facilitate understanding of various aspects of the disclosure, it will be readily apparent to those of ordinary skill that in other embodiments more steps may be added, or certain steps may be omitted, modified, combined, or performed in a different order in view of the disclosure.

To begin, it is assumed that the NE 110 is an Application Server (AS) of a IP Multimedia Subsystem (IMS) network configured for enabling or maintaining an ongoing VoLTE call session between the LTE enabled mobile UE 101 and another device (e.g., another LTE enabled UE) via the telecommunication network 100. It is assumed that the LTE enabled mobile UE 101 is interconnected to the NE 110 via a base-station of an LTE access network, which is not shown in FIG. 1 for simplicity. It is further assumed that a VoLTE call session has already been established, such that the NE 110 (via the CTF 112) has sent an ACR START message at the beginning of the VoLTE session to the OFCS 120 and has further sent one or more ACR INTERIM messages reporting the mobile UE 101's interim location and time-zone information to the OFCS 120 as appropriate.

Turning now to process 200 of FIG. 2, in step 202 the NE 110 transmits a Session Initiation Protocol (SIP) session end message to the subscriber UE 101 to teardown the VoLTE session being provided to the UE over the telecommunications network. The SIP session end message may be a SIP BYE message. The NE 110 may transmit the SIP BYE message to the UE 101 to terminate the VoLTE session being provided via the telecommunications network, which termination may be initiated by the NE 110 itself, or by the other party that is in communication with the UE 101. In one aspect, the NE 110 may also transmit the SIP BYE message to terminate the VoLTE session when the NE detects a handover of the session to, for example, a Circuit Switched (CS) network or an unlicensed spectrum such as WIFI.

In addition, in one aspect the NE 110 generates a Accounting Charge Request (ACR) STOP message for the VoLTE session based upon the time of transmission of the SIP BYE message to the UE 101, and, delays the transmission of the ACR stop message to the OFCS to wait for a response message from the UE 101 to the SIP BYE message.

In step 204, the NE 110 receives a SIP response message from the UE 101 in response to the SIP session end message. In one aspect, the SIP response message may be a SIP OK message acknowledging the SIP BYE message without errors. In other aspects, the SIP response message may be a SIP 2xx/3xx/4xx acknowledgement message with errors. The SIP response message from the UE 101 may include updated information that indicates the mobile UE's updated location or time-zone, which may be included in the SIP response message if the respective information has changed since the last time the UE reported the information (e.g., in a prior message during the VoLTE session).

In step 206, the NE 110 determines whether the SIP response message includes an update to the last known User Location Information (ULI) or the last known Time-Zone (TZ) of UE 101. For example, the NE 110 may parse one or more fields of information included in the SIP response message to determine that the response message has reported updated ULI or TZ information. Since UE's are typically configured to report changes, the inclusion of such updated ULI or TZ information typically means that the information has changed from prior reported values (last known information). The SIP response message may include an updated ULI reported by the UE. The SIP response message may include an updated TZ reported by the UE. In some aspects, the SIP response message may also indicate the UE's ULI or TZ information as Unknown, in situations where an error or other cause results in the UE being unable to determine its location or time-zone.

In step 208, the NE 110 includes the update to the UE's last known ULI or the UE's last known TZ in the generated ACR STOP message if such updated information is determined to have been included in the SIP response. For example, if the response message received from the UE includes updated ULI information, the NE 110 includes the updated ULI information in the ACR STOP message to report it to the OFCS 120. Alternatively, or in addition, if the response message includes updated TZ information, the NE 110 includes the TZ information in the ACR STOP message. If the SIP response message indicates that either the UE's location or time-zone is Unknown, this information is also included in the ACR STOP message to report to the OFCS. In one aspect, NE/CTF can be optionally configured for a waiting timer, if timer expires, the NE/CTF will send ACR STOP to CDF. The timer may also be configured with a value 0, if desired, where the NE/CTF will not wait for UE response.

In one aspect, the NE 110 also includes an additional (and new) AVP in the ACR STOP message for indicating to the OFCS the information that is being provided in the ACR STOP message. The additional AVP indicates to the OFCS whether the UE's updated ULI is included (or not), whether the UEs updated TZ information is included (or not), or whether both are included (or not). The additional AVP may also indicate to the OFCS that either the UE's location or time-zone is Unknown. Further, in some aspects the additional AVP may also indicate the cause of the teardown of the VoLTE call. For example, in one aspect the additional AVP may indicate to the OFCS that the NE has detected a handover of the session to a Circuit-Switched network, or to a unlicensed spectrum (e.g., WIFI) network, by way of some examples.

In step 210, the NE 110 transmits the ACR STOP message to the Offline Charging System (OFCS) 120 of the telecommunications network using the Diameter Protocol.

A number of advantages may be apparent from the description of process 200 above. To begin with, the NE is configured to wait for the SIP response message from the UE instead of transmitting the ACR STOP message to the OFCS as soon as the SIP message is transmitted to the UE to teardown the VoLTE session. Delaying the transmission of the ACR STOP message to the OFCS enables the NE to take into account and any updates to the UE's ULI or TZ that are received from the UE in the response message. The updates received in the response message are reported to the OFCS in the ACR STOP message, thus plugging the revenue-leakage gap that can occur during call teardown in conventional implementations. The OFCS receives updated location or time-zone information during call teardown, which enables the OFCS to properly account for any such updates when generating CDRs for the VoLTE session. To prevent overcharging of the session, the NE is configured to indicate the time (e.g., timestamp) of the end of the session in the ACR STOP message based on the time the session end message is transmitted to the UE. Thus, even though the ACR STOP message to the OFCS is delayed to receive and process the response message from the UE, it does not result in the subscriber being charged for the delay as part of the session. The NE/CTF may utilize a timer that is set to an appropriate period of time within which the response would be expected to be received. In rare cases where the response never arrives at the NE, the expiration of the timer may trigger transmission of the ACR STOP message to the OFCS. Yet further, a new AVP is provided in the ACR STOP message for indicating information being provided in the ACR STOP message, which also indicates to the OFCS whether a handover has been detected. In some embodiments, the foregoing process may also be applicable to tearing down data sessions in addition to voice sessions.

The present disclosure contemplates a proposed change to the standardized format of the conventional ACR STOP message. A new AVP field in the ACR STOP message, where the new AVP indicates the updates that are being provided to the OFCS in the ACR STOP message. The general form of the new AVP included in the ACR Stop message is shown below:

AVP Name: VoLTE-Call-Termination-Indication
Type: Enumerated
AVP Code: To Be Determined (by standards body)
Vendor-Id: 1751 (until standardized)
Characteristics: —SE (that is, it can be expected in ACR Stop and ACR Event messages)
Flags: P-bit may be set, M-bit unset and V-bit set (before standardization) and the M- and V-bits get reversed afterwards (after standardization)

The VoLTE-Call-Termination enumeration may take the following exemplary values:
0: Updated ULI and TZ sent
1: Only updated ULI sent, TZ unchanged
2: Only updated TZ sent, ULI unchanged
3: Neither TZ nor ULI changed, none sent
4: Unknown TZ/ULI, none sent
5: Unlicensed Spectrum (WiFi or LTE-U) handover detected with updated ULI and TZ sent
6: Unlicensed Spectrum (WiFi or LTE-U) handover detected without updated ULI and TZ sent Other enumeration values may be used for indicating other call termination scenarios.

With the inclusion of the new AVP in the ACR STOP message sent by the NE to the OFCS, a CDF (of the OFCS) is enabled to generate a compete CDR for the VoLTE session with the correct indication for user location and the TZ, as available from the network. This provides for a correct rating of the call or session.

Other embodiments may use other mechanisms without departing from the principles of the disclosure, as will be understood.

Figure 3:
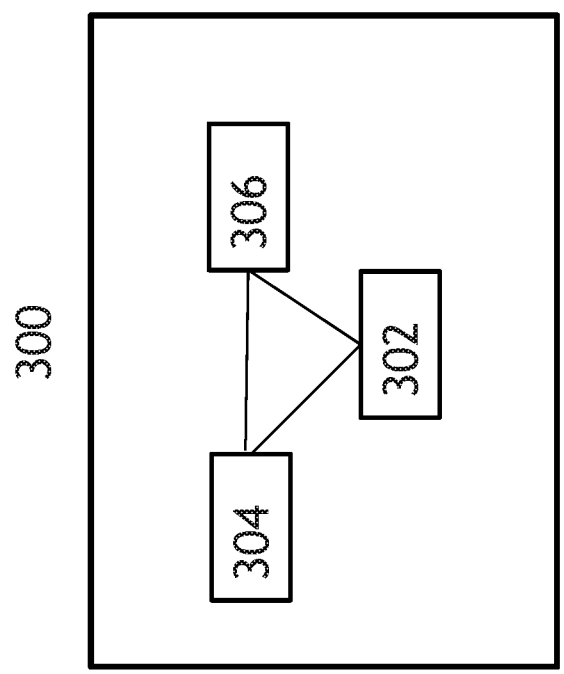
FIG. 3 illustrates a block-diagram example of an apparatus for implementing various aspects of the disclosure.

FIG. 3 depicts a high-level block diagram of a computing apparatus 300 suitable for implementing various aspects of the disclosure (e.g., one or more steps of process 200). Although illustrated in a single block, in other embodiments the apparatus 300 may also be implemented using parallel and distributed architectures. Thus, for example, one or more of the various units of architecture 100 of FIG. 1 discussed above, such as the NE 110 (including CTF 112), the CDF 121, the CGF 122, and other components disclosed herein may be implemented using apparatus 300. Furthermore, various steps such as those illustrated in the example of process 200 may be executed using apparatus 300 sequentially, in parallel, or in a different order based on particular implementations. Exemplary apparatus 300 includes a processor 302 (e.g., a central processing unit ("CPU")), that is communicatively interconnected with various input/output devices 304 and a memory 306. Apparatus 300 may be implemented as one or more blades in a blade chassis.

The processor 302 may be any type of processor such as a general purpose central processing unit ("CPU") or a dedicated microprocessor such as an embedded microcontroller or a digital signal processor ("DSP"). The input/output devices 304 may be any peripheral device operating under the control of the processor 302 and configured to input data into or output data from the apparatus 300, such as, for example, network adapters, data ports, and various user interface devices such as a keyboard, a keypad, a mouse, or a display.

Memory 306 may be any type or combination of memory suitable for storing and accessing electronic information, such as, for example, transitory random access memory (RAM) or non-transitory memory such as read only memory (ROM), hard disk drive memory, database memory, compact disk drive memory, optical memory, etc. The memory 306 may include data and instructions which, upon execution by the processor 302, may configure or cause the apparatus 300 to perform or execute the functionality or aspects described hereinabove (e.g., one or more steps of process 200). In addition, apparatus 300 may also include other components typically found in computing systems, such as an operating system, queue managers, device drivers, database drivers, or one or more network protocols that are stored in memory 306 and executed by the processor 302.

While a particular embodiment of apparatus 300 is illustrated in FIG. 3, various aspects in accordance with the present disclosure may also be implemented using one or more application specific integrated circuits (ASICs), field programmable gate arrays (FPGAs), or any other combination of dedicated or programmable hardware.

Although aspects herein have been described with reference to particular embodiments, it is to be understood that these embodiments are merely illustrative of the principles and applications of the present disclosure. It is therefore to be understood that numerous modifications can be made to the illustrative embodiments and that other arrangements can be devised without departing from the spirit and scope of the disclosure.

The invention claimed is:

1. A network element of a telecommunications network, the network element comprising:
   a memory for storing instructions and data, and a processor configured to execute the instructions and to process the data, wherein the instructions, when executed by the processor, configure the network element to:
      transmit a Session Initiation Protocol (SIP) session end message to a subscriber User Equipment (UE) to teardown a VoLTE session being provided to the UE over the telecommunications network;
      receive a SIP response message from the UE;
      determine that the SIP response message includes an update to the UE's last known User Location Information (ULI) or the UE's last known Time-Zone (TZ);
      generate a Accounting Charge Request (ACR) STOP message for the VoLTE session;
      include the update to the UE's last known ULI or the UE's last known TZ in the generated ACR STOP message; and;
      transmit the ACR STOP message to an Offline Charging System (OFCS) of the telecommunications network using the Diameter Protocol.

2. The network element of claim 1, wherein the network element is further configured to:
   indicate a VoLTE session end time in the ACR STOP message to the OFCS based on the time of transmission of the SIP session end message to the UE.

3. The network element of claim 1, wherein the SIP session end message is an SIP BYE message.

4. The network element of claim 1, wherein the SIP response message is an SIP OK message.

5. The network element of claim 2, wherein the network element is further configured to:
   include an enumerated value in an Address-Value-Pair (AVP) field of the ACR STOP message for indicating to the OFCS that a change in the UE's last known ULI has been detected and that the update to the UE's last known ULI is included in the ACR STOP message.

6. The network element of claim 2, wherein the network element is further configured to:
   include an enumerated value in an Address-Value-Pair (AVP) field of the ACR STOP message for indicating to the OFCS that a change in the UE's last known TZ has been detected and that the update to the UE's last known TZ is included in the ACR STOP message.

7. The network element of claim 2, wherein the network element is further configured to:
   detect there has been a handover of the UE's VoLTE session into an Unlicensed Spectrum; and,
   include an enumerated value in an Address-Value-Pair (AVP) field of the ACR STOP message for indicating to the OFCS that the handover of the UE's VoLTE session into the Unlicensed Spectrum has been detected.

8. A computer-implemented method for processing VoLTE call teardown in a network element of a telecommunications network, the method comprising:
   transmitting a Session Initiation Protocol (SIP) session end message to a subscriber User Equipment (UE) to teardown a VoLTE session being provided to the UE over the telecommunications network;
   receiving a SIP response message from the UE;
   determining that the SIP response message includes an update to the UE's last known User Location Information (ULI) or the UE's last known Time-Zone (TZ);

generating a Accounting Charge Request (ACR) STOP message for the VoLTE session;
including the update to the UE's last known ULI or the UE's last known TZ in the generated ACR STOP message; and;
transmitting the ACR STOP message to an Offline Charging System (OFCS) of the telecommunications network using the Diameter Protocol.

9. The computer-implemented method of claim 8, further comprising:
indicating a VoLTE session end time in the ACR STOP message to the OFCS based on the time of transmission of the SIP session end message to the UE.

10. The computer-implemented method of claim 8, wherein the SIP session end message is an SIP BYE message.

11. The computer-implemented method of claim 8, wherein the SIP response message is an SIP OK message.

12. The computer-implemented method of claim 9, further comprising:
including an enumerated value in an Address-Value-Pair (AVP) field of the ACR STOP message for indicating to the OFCS that a change in the UE's last known ULI has been detected and that the update to the UE's last known ULI is included in the ACR STOP message.

13. The computer-implemented method of claim 9, further comprising:
including an enumerated value in an Address-Value-Pair (AVP) field of the ACR STOP message for indicating to the OFCS that a change in the UE's last known TZ has been detected and that the update to the UE's last known TZ is included in the ACR STOP message.

14. The computer-implemented method of claim 8, further comprising:
detecting there has been a handover of the UE's VoLTE session into an Unlicensed Spectrum; and,
including an enumerated value in an Address-Value-Pair (AVP) field of the ACR STOP message for indicating to the OFCS that the handover of the UE's VoLTE session into the Unlicensed Spectrum has been detected.

15. The network element of claim 6, wherein the network element is further configured to:
include an enumerated value in the Address-Value-Pair (AVP) field of the ACR STOP message indicating that the UE's last known User Location Information (ULI) or the UE's last known Time-Zone (TZ) has not changed, or that the UE's current ULI or the UE's current TZ may have changed and is unknown.

* * * * *